United States Patent
Liu et al.

(10) Patent No.: US 11,044,122 B2
(45) Date of Patent: Jun. 22, 2021

(54) SEMI-BLIND CHANNEL ESTIMATION METHOD AND APPARATUS

(71) Applicant: SHEN ZHEN KUANG-CHI HEZHONG TECHNOLOGY LTD, Shenzhen (CN)

(72) Inventors: Ruopeng Liu, Shenzhen (CN); Chunlin Ji, Shenzhen (CN); Lin You, Shenzhen (CN)

(73) Assignee: SHEN ZHEN KUANG-CHI HEZHONG TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 16/708,635

(22) Filed: Dec. 10, 2019

(65) Prior Publication Data
US 2020/0119954 A1 Apr. 16, 2020

Related U.S. Application Data

(63) Continuation of application No. PCT/CN2018/079730, filed on Mar. 21, 2018.

(30) Foreign Application Priority Data

Dec. 29, 2017 (CN) .......................... 201711487278.6

(51) Int. Cl.
*H04J 11/00* (2006.01)
*H04L 25/02* (2006.01)
(Continued)

(52) U.S. Cl.
CPC ....... *H04L 25/0256* (2013.01); *H04B 7/0408* (2013.01); *H04L 25/0238* (2013.01); *H04J 3/14* (2013.01); *H04L 1/0059* (2013.01)

(58) Field of Classification Search
None
See application file for complete search history.

(56) References Cited

U.S. PATENT DOCUMENTS

2006/0109934 A1    5/2006   Krupka
2010/0296556 A1*  11/2010   Rave ................ H04L 25/03171
                                                          375/219
(Continued)

FOREIGN PATENT DOCUMENTS

| CN | 103475606 A  | 12/2013 |
| CN | 106230754 A  | 12/2016 |
| WO | 2016115627 A1 | 7/2016 |

OTHER PUBLICATIONS

International Search Report for corresponding application PCT/CN2018/079730 filed Mar. 21, 2018; dated Sep. 25, 2018.

*Primary Examiner* — Clemence S Han
(74) *Attorney, Agent, or Firm* — Cantor Colburn LLP

(57) ABSTRACT

A semi-blind channel estimation method and apparatus are provided. The semi-blind channel estimation method includes: step S1: obtaining data that includes a first training sequence and that is received by a receive end; step S2: performing minimum mean square error channel estimation based on the data and the prestored first training sequence, to obtain a channel parameter matrix; step S3: detecting the first training sequence by using a least square detection algorithm, to obtain estimated data; and step S4: using the estimated data as a second training sequence, replacing the first training sequence in step S2 with the second training sequence, and cyclically performing step S2 and step S3 on the second training sequence, until a channel parameter matrix obtained last time is the same as a channel parameter matrix obtained this time, and then stopping circulation, to estimate a final channel parameter matrix.

6 Claims, 6 Drawing Sheets

(51) Int. Cl.
*H04B 7/0408* (2017.01)
*H04J 3/14* (2006.01)
*H04L 1/00* (2006.01)

(56) References Cited

U.S. PATENT DOCUMENTS

| | | | |
|---|---|---|---|
| 2011/0173508 A1* | 7/2011 | Wehinger | H04L 25/03292 714/748 |
| 2011/0312275 A1* | 12/2011 | Canpolat | H04L 25/0328 455/63.1 |
| 2012/0321025 A1* | 12/2012 | Sezginer | H04L 25/0256 375/346 |
| 2013/0129023 A1* | 5/2013 | Hu | H04L 25/0226 375/346 |
| 2014/0328380 A1* | 11/2014 | Pustovalov | H04L 25/03885 375/232 |
| 2017/0238317 A1* | 8/2017 | Choi | H04L 25/0228 375/341 |
| 2017/0257246 A1* | 9/2017 | Zhuang | H04L 27/2657 |
| 2017/0288911 A1* | 10/2017 | Rusek | H04B 7/0413 |
| 2018/0123837 A1* | 5/2018 | Barbu | H04L 25/0242 |

\* cited by examiner

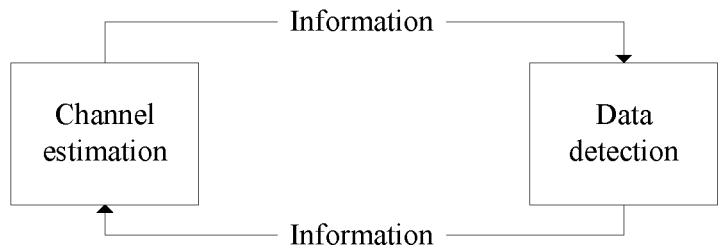
FIG. 2
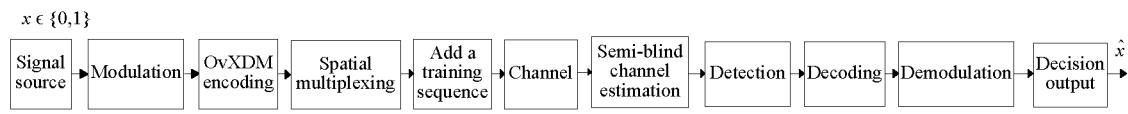
FIG. 3
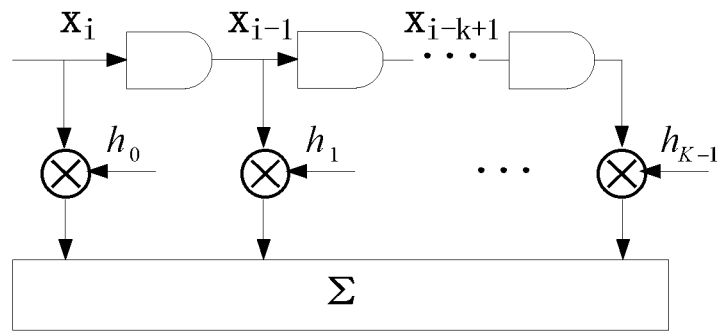
FIG. 4
$$a_0x_0 \quad a_1x_0 \quad a_2x_0 \quad ... \quad a_{k-1}x_0$$
$$a_0x_1 \quad a_1x_1 \quad a_2x_1 \quad ... \quad a_{k-1}x_1$$
$$a_0x_2 \quad a_1x_2 \quad a_2x_2 \quad ... \quad a_{k-1}x_2$$
$$...$$
$$a_0x_{k-1} \quad a_1x_{k-1} \quad a_2x_{k-1} \quad ... \quad a_{k-1}x_{k-1}$$
FIG. 5

SEMI-BLIND CHANNEL ESTIMATION METHOD AND APPARATUS

CROSS REFERENCE TO RELATED APPLICATIONS

This application is a continuation of International Patent Application Number PCT/CN2018/079730 filed on Mar. 21, 2018, which claimed priority to Chinese Patent Application No. 201711487278.6 filed on Dec. 29, 2017, whereby the entire contents of both of said applications is incorporated herein by reference.

TECHNICAL FIELD

The present disclosure relates to the channel estimation field, and specifically, to a semi-blind channel estimation method and apparatus.

BACKGROUND

In a communications system, spectral efficiency of transmission in the system can be significantly improved by using an overlapped multiplexing encoding mode for data encoding. In a current overlapped multiplexing system, that is, an OvXDM system (X indicates any domain, including time domain T, space domain S, frequency domain F, code domain C, hybrid domain H, or the like), a multiple-antenna technology is also used, thereby improving a system transmission rate. However, in a multiple-antenna overlapped multiplexing system, when a channel parameter is unknown, channel estimation processing needs to be performed, and performance of least square channel estimation based on a training sequence needs to be improved.

For the problem in the prior art, no effective solution is currently proposed.

SUMMARY

The present disclosure discloses a semi-blind channel estimation method and apparatus, to at least resolve a prior-art problem that, in a multiple-antenna overlapped multiplexing system, when a channel parameter is unknown, performance of least square channel estimation based on a training sequence needs to be improved.

According to an aspect of the present disclosure, a semi-blind channel estimation method is provided. The semi-blind channel estimation method is applied to a receive end of a multiple-antenna overlapped multiplexing system. The method includes: step S1: obtaining data that includes a first training sequence and that is received by the receive end; step S2: performing minimum mean square error channel estimation based on the data and the prestored first training sequence, to obtain a channel parameter matrix; step S3: detecting the first training sequence by using a least square detection algorithm, to obtain estimated data; and step S4: using the estimated data as a second training sequence, replacing the first training sequence in step S2 with the second training sequence, and cyclically performing step S2 and step S3 on the second training sequence, until a channel parameter matrix obtained last time is the same as a channel parameter matrix obtained this time, and then stopping circulation, to estimate a final channel parameter matrix.

According to an embodiment of the present disclosure, before the performing minimum mean square error channel estimation based on the data and the prestored first training sequence, to obtain a channel parameter matrix, the method includes: determining a first relational expression between the data and the first training sequence, where the first training sequence in the data is a training sequence including noise, and the first relational expression is as follows:

$R = HS + N,$ where R indicates the data, H indicates the channel parameter matrix, S indicates the first training sequence, and N indicates a noise matrix.

According to an embodiment of the present disclosure, the performing minimum mean square error channel estimation based on the data and the prestored first training sequence, to obtain a channel parameter matrix includes determining a joint vector coefficient based on the first relational expression and a minimum mean square error channel estimation algorithm, and identifying a quantity of times of estimating the joint vector coefficient by using a flag bit, where the joint vector coefficient satisfies the following formula:

$$\hat{w}_k = \min_w \{(H - wR)^2\},$$

where $\hat{w}_k$ indicates a joint vector coefficient obtained through the $k^{th}$ estimation; and determining the channel parameter matrix based on a second relational expression about a joint vector and the joint vector coefficient, where the second relational expression about the joint vector is $\hat{H}_k = \hat{w}_k R$, and the channel parameter matrix is as follows:

$$\hat{H}_k = \frac{R_{\hat{H}_{k-1}}}{\left(R_{\hat{H}_{k-1}} + \sigma^2 (\hat{S}_{k-1} \hat{S}_{k-1}^H)^{-1}\right)} \cdot \frac{R}{\hat{S}_{k-1}},$$

where $(\hat{S}_{k-1})^H$ indicates a conjugate transpose operation of $(\hat{S}_{k-1})$, $(\hat{S}_{k-1} \hat{S}_{k-1}^H)^{-1}$ indicates an inverse operation of $(\hat{S}_{k-1} \hat{S}_{k-1}^H)$, $R_{\hat{H}_{k-1}} = E[\hat{H}_{k-1} \hat{H}_{k-1}^H]$, $R_{\hat{H}_{k-1}}$ indicates a channel autocorrelation matrix corresponding to an estimated channel parameter matrix, $$R_{\hat{H}_{k-1}} = E[HH^H]$$

upon the first estimation, $E(HH^H)$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ time, $\hat{S}_{k-1}$ indicates estimated data obtained at the $(k-1)^{th}$ time, and $\hat{H}_k$ indicates a channel parameter matrix obtained at the $k^{th}$ time.

According to an embodiment of the present disclosure, the detecting the first training sequence by using a least square detection algorithm, to obtain estimated data includes: identifying a quantity of times of estimating the estimated data by using a flag bit, where the estimated data is as follows:

$\hat{S}_k = (\hat{H}_k^H \hat{H}_k)^{-1} \hat{H}_k R,$ where $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$, and $\hat{S}_k$ indicates estimated data obtained at the $k^{th}$ time.

According to an embodiment of the present disclosure, the semi-blind channel estimation method further includes: determining, by using a third relational expression, that a channel parameter matrix obtained last time is the same as a channel parameter matrix obtained this time, where the third relational expression is as follows:

$$(\hat{H}_{k-1}, \hat{S}_{k-1}) = (\hat{H}_k, \hat{S}_k),$$

where $\hat{S}_k$ indicates the estimated data obtained at the $k^{th}$ time.

According to another aspect of the present disclosure, a semi-blind channel estimation apparatus is provided.

The semi-blind channel estimation apparatus includes: an obtaining module, configured to: obtain data that includes a first training sequence and that is received by the receive end; an estimation module, configured to: perform minimum mean square error channel estimation based on the data and the prestored first training sequence, to obtain a channel parameter matrix; a detection module, configured to: detect the first training sequence by using a least square detection algorithm, to obtain estimated data; and a circulation module, configured to: use the estimated data as a second training sequence, replace the first training sequence in the estimation module with the second training sequence, and cyclically perform operations on the second training sequence by using the estimation module and the detection module, until a channel parameter matrix obtained last time is the same as a channel parameter matrix obtained this time, and then stop circulation, to estimate a final channel parameter matrix.

According to an embodiment of the present disclosure, the semi-blind channel estimation apparatus further includes: a determining module, configured to: determine a first relational expression between the data and the first training sequence, where the first training sequence in the data is a training sequence including noise, and the first relational expression is as follows:

$$R = HS + N,$$

where R indicates the data, H indicates the channel parameter matrix, S indicates the first training sequence, and N indicates a noise matrix.

According to an embodiment of the present disclosure, the estimation module includes: a first determining module, configured to: determine a joint vector coefficient based on the first relational expression and a minimum mean square error channel estimation algorithm, and identify a quantity of times of estimating the joint vector coefficient by using a flag bit, where the joint vector coefficient satisfies the following formula:

$$\hat{w}_k = \min_w \{(H - wR)^2\},$$

where $\hat{w}_k$ indicates a joint vector coefficient obtained through the $k^{th}$ estimation; and a second determining module, configured to: determine the channel parameter matrix based on a second relational expression about a joint vector and the joint vector coefficient, where the second relational expression about the joint vector is $\hat{H}_k = \hat{w}_k R$, and the channel parameter matrix is as follows:

$$\hat{H}_k = \frac{R_{\hat{H}_{k-1}}}{\left(R_{\hat{H}_{k-1}} + \sigma^2 (\hat{S}_{k-1} \hat{S}_{k-1}^H)^{-1}\right)} \cdot \frac{R}{\hat{S}_{k-1}},$$

where $(\hat{S}_{k-1})^H$ indicates a conjugate transpose operation of $(\hat{S}_{k-1})$, $(\hat{S}_{k-1} \hat{S}_{k-1}^H)^{-1}$ indicates an inverse operation of $(\hat{S}_{k-1} \hat{S}_{k-1}^H)$, $R_{\hat{H}_{k-1}} = E[\hat{H}_{k-1} \hat{H}_{k-1}^H]$, $R_{\hat{H}_{k-1}}$ indicates a channel autocorrelation matrix corresponding to an estimated channel parameter matrix, $$R_{\hat{H}_{k-1}} = E[HH^H]$$

upon the first estimation, $E(HH^H)$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ time, $\hat{S}_{k-1}$ indicates estimated data obtained at the $(k-1)^{th}$ time, and $\hat{H}_k$ indicates a channel parameter matrix obtained at the $k^{th}$ time.

According to an embodiment of the present disclosure, the detection module includes: an identification module, configured to: identify a quantity of times of estimating the estimated data by using a flag bit, where the estimated data is as follows:

$$\hat{S}_k = (\hat{H}_k^H \hat{H}_k)^{-1} \hat{H}_k R,$$

where $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$, and $\hat{S}_k$ indicates estimated data obtained at the $k^{th}$ time.

According to an embodiment of the present disclosure, the semi-blind channel estimation apparatus further includes: a third determining module, configured to: determine, by using a third relational expression, that a channel parameter matrix obtained last time is the same as a channel parameter matrix obtained this time, where the third relational expression is as follows:

$$(\hat{H}_{k-1}, \hat{S}_{k-1}) = (\hat{H}_k, \hat{S}_k),$$

where $\hat{S}_k$ indicates the estimated data obtained at the $k^{th}$ time.

A beneficial technical effect of the present disclosure lies in:

In the present disclosure, in the multiple-antenna overlapped multiplexing system, semi-blind channel estimation is performed based on a least square and a minimum mean square error. In one aspect, a very few training symbols are used, and the minimum mean square error channel estimation algorithm is used to estimate and initialize a channel coefficient, and a recycling algorithm of a blind channel is used, to transmit wanted information as accurately as possible while sacrificing very low bandwidth. In another aspect, estimated data is used as a known training sequence, to leverage an advantage of channel estimation based on a training sequence, and actual known training information is used to restore an originally transferred information sequence, so that a random channel parameter matrix in the multiple-antenna overlapped multiplexing system can be estimated, and performance is superior to performance of least square channel estimation based on a training sequence.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 2 is a diagram of an optional iteration relationship between channel estimation and data detection in semi-blind channel estimation according to an embodiment of the present disclosure;

FIG. 3 is a block diagram of an optional multiple-antenna overlapped multiplexing system according to an embodiment of the present disclosure;

FIG. 4 shows an optional equivalent waveform convolutional coding model of an overlapped time division multiplexing system according to an embodiment of the present disclosure;

FIG. 5 is an optional schematic diagram of multiplexing of K waveforms according to an embodiment of the present disclosure;

DESCRIPTION OF EMBODIMENTS

Figure 1:
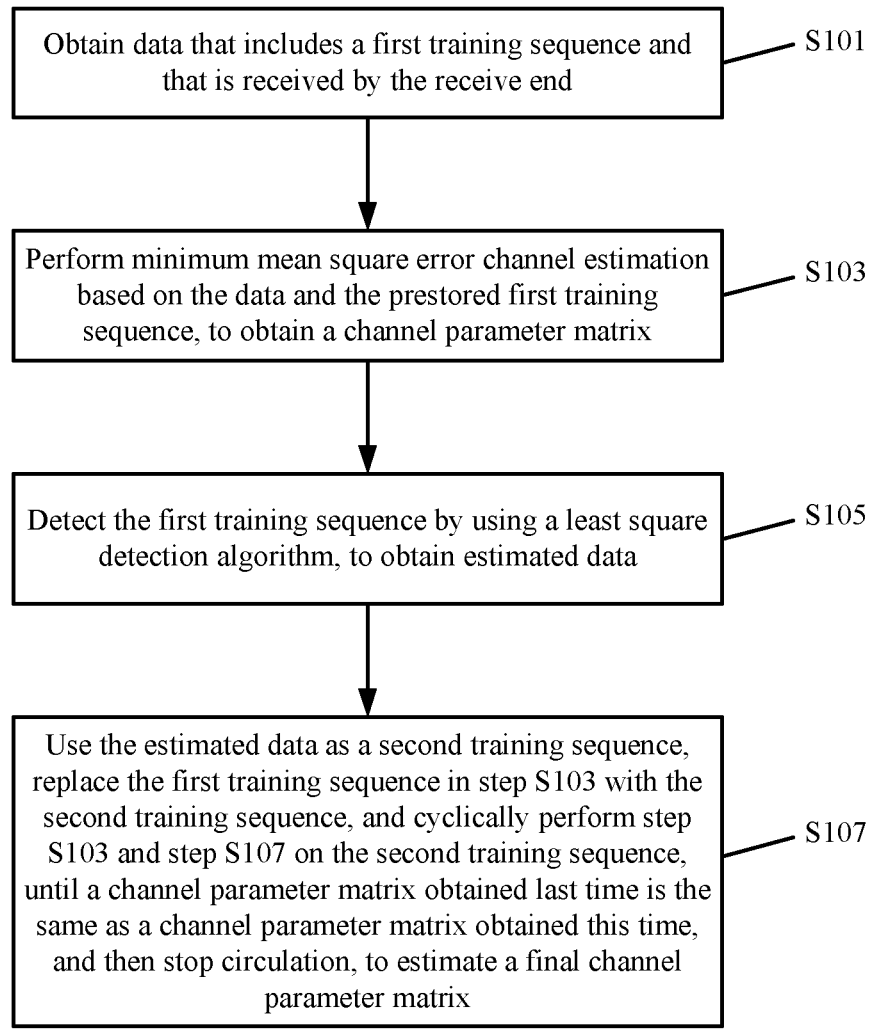
FIG. 1 is a flowchart of an optional semi-blind channel estimation method according to an embodiment of the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

It should be noted that terms such as "first" and "second" in the specification, claims, and accompanying drawings of the present disclosure are used to distinguish between similar objects, and are not necessarily used to describe a particular sequence or order. It should be understood that data used in such a way may be interchangeable in a proper circumstance, so that the embodiments of the present disclosure described herein can be implemented in a sequence other than those shown in the drawings or described herein. Moreover, terms "including" "having", and any other variant thereof are intended to cover a non-exclusive inclusion. For example, a process, a method, a system, a product, or a device that includes a series of steps or units is not necessarily limited to those expressly listed steps or units, but may include other steps or units that are not expressly listed or that are inherent to such a process, method, product, or device.

According to an embodiment of the present disclosure, a semi-blind channel estimation method is provided. It should be noted that the channel estimation method is applicable to a receive end of a multiple-antenna overlapped multiplexing system. The multiple-antenna overlapped multiplexing system includes a transmit end and the receive end.

As shown in FIG. 1, the semi-blind channel estimation method according to this embodiment of the present disclosure includes the following steps: Step S101: Obtain data that includes a first training sequence and that is received by the receive end. Step S103: Perform minimum mean square error channel estimation based on the data and the prestored first training sequence, to obtain a channel parameter matrix. Step S105: Detect the first training sequence by using a least square detection algorithm, to obtain estimated data. Step S107: Use the estimated data as a second training sequence, replace the first training sequence in step S103 with the second training sequence, and cyclically perform step S103 and step S107 on the second training sequence, until a channel parameter matrix obtained last time is the same as a channel parameter matrix obtained this time, and then stop circulation, to estimate a final channel parameter matrix.

According to the foregoing technical solution, in the multiple-antenna overlapped multiplexing system, semi-blind channel estimation is performed based on a least square and a minimum mean square error. In one aspect, a very few training symbols are used, and the minimum mean square error channel estimation algorithm is used to estimate and initialize a channel coefficient, and a recycling algorithm of a blind channel is used, to transmit wanted information as accurately as possible while sacrificing very low bandwidth. In another aspect, estimated data is used as a known training sequence, to leverage an advantage of channel estimation based on a training sequence, and actual known training information is used to restore an originally transferred information sequence, so that a random channel parameter matrix in the multiple-antenna overlapped multiplexing system can be estimated, and performance is superior to performance of least square channel estimation based on a training sequence.

To better describe the technical solutions in the present disclosure, the following gives detailed description by using specific embodiments.

By applying the semi-blind channel estimation method in the present disclosure to the multiple-antenna overlapped multiplexing system, a random channel parameter matrix in the multiple-antenna overlapped multiplexing system can be estimated, and performance is superior to performance of least square channel estimation based on a training sequence. The multiple-antenna overlapped multiplexing system is specifically as follows:

As shown in FIG. 3, a signal source outputs a bit sequence (0, 1); then a series of processing is performed on the bit sequence, including input bit stream modulation and OvXDM encoding; then data is divided into a plurality of data streams through spatial multiplexing, a training sequence is added to the plurality of data streams, the plurality of data streams are sent through a plurality of transmit antennas, and a plurality of receive antennas receive data; then semi-blind channel estimation is performed, and a received training sequence is removed; and then a plurality of data streams are correspondingly detected, decoded, demodulated, and finally output through decision. Note: When OvFDM encoding is applied, inverse fast Fourier transformation (IFFT) needs to be added after encoding. After detection is performed, a fast Fourier transformation (FFT) operation needs to be performed. Likewise, the training sequence needs to be correspondingly transformed so that the training sequence and encoded data are located in a same domain. The following describes the foregoing steps in detail.

First, sending process:

1. Modulation

Various digital baseband signals are converted into modulation signals suitable for channel transmission. Common modulation modes include BPSK, QPSK, 16QAM, and the like. For example, according to an embodiment of the present disclosure, using BPSK modulation as an example below, data 1 is output as 1 after undergoing BPSK modulation, and data 0 is output as −1 after undergoing BPSK modulation.

2. OvXDM Encoding

A specific encoding process of the OvXDM encoding is as follows:

(1) Generate an envelope waveform in modulation domain based on a design parameter.

(2) Shift the envelope waveform in modulation domain based on a quantity of times of overlapped multiplexing and a preset shift interval, to obtain shifted envelope waveforms in modulation domain.

(3) Multiply symbols in a to-be-modulated sequence by shifted envelope waveforms respectively corresponding to the symbols, to obtain modulated envelope waveforms in modulation domain.

(4) Superpose the modulated envelope waveforms in modulation domain, to obtain a complex modulated envelope waveform in modulation domain.

The following uses the OvTDM encoding an example, and the encoding is specifically as follows:

An encoding process is shown in FIG. 4. A symbol superposition process is presented as a parallelogram, as shown in FIG. 5. A specific process includes the following steps:

(1) First, design and generate a transmit signal envelope waveform h(t).

(2) Perform a specific time shift on the envelope waveform h(t) designed in (1), to form transmit signal envelope waveforms h(t−i×ΔT) of other moments.

(3) Multiply a to-be-transmitted symbol $x_i$ by an envelope waveform h(t−i×ΔT) of a corresponding moment that is generated in (2), to obtain to-be-transmitted signal waveforms $x_i$h(t−i×ΔT) of the moments.

(4) Superpose the to-be-transmitted signal waveforms $x_i$h(t−i×ΔT) formed in (3), to form a transmit signal waveform.

(5) The transmit signal may be represented as follows:

$$s(t) = \sum_i x_i h(t - i \times \Delta T)$$

3. Spatial Multiplexing

In a spatial multiplexing technology, to-be-transmitted data is divided into several data streams and then transmitted through different antennas, thereby improving a system transmission rate. A common space-time multiplexing technology is a layered space-time code proposed by Bell Labs.

If there are M transmit antennas, encoded data is divided into M data streams for transmission. The following describes a data splitting process by using two transmit antennas and OvTDM encoding as an example. Details are as follows:

Assuming that a length of data obtained through OvTDM encoding is L, the data splitting process is described by using the first 8 bits of data as an example: The first 8 bits of OvTDM encoding output is as follows: (0.0150−0.0150i, 0.0240−0.0240i, 0.0410−0.0410i, 0.0641−0.0641i, 0.0911−0.0911i, 0.1197−0.1197i, 0.1475−0.1474i, 0.1719−0.1719i). Data in odd and even positions in the 8 bits of data is split: $S_1$=(0.0150−0.0150i, 0.0410−0.0410i, 0.0911−0.0911i, 0.1475−0.1474i); S2=(0.0240−0.0240i, 0.0641−0.0641i, 0.1197−0.1197i, 0.1719−0.1719i), where $S_1$ indicates data corresponding to old positions in the modulated output data, and $S_2$ indicates data corresponding to even positions in the modulated output data. $S_1$ and $S_2$ are output as two data streams and transmitted through two transmit antennas.

4. Add a Training Sequence

A training sequence design needs to satisfy an orthogonality principle of a training sequence and also needs to implement relatively low calculation complexity in a channel estimation process. The following describes a training sequence used in a spatial multiplexing system by using two transmit antennas and two receive antennas as an example. Details are as follows:

Assuming that a length of a training sequence is M1 and a length of a non-zero element is M1/2, for two data streams, a form of the training sequence thereof is [M1/2 non-zero elements, M1/2 zero elements, M1/2 zero elements, M1/2 non-zero elements] or [M1/2 zero elements, M1/2 non-zero elements, M1/2 non-zero elements, M1/2 zero elements]. This structure can ensure orthogonality of the training sequence. Non-zero elements are +1 and −1. Then the training sequence is placed in front of two data streams that are output through spatial multiplexing, to form the following structure: [M1/2 non-zero elements, M1/2 zero elements, $S_1$; M1/2 zero elements, M1/2 non-zero elements, $S_2$]. Data corresponding to this structure is transmitted through two transmit antennas (the training sequence is known at a receive end).

In addition, for example, M1=8, two streams of data in the first 8 bits are output through spatial multiplexing, and the first structure is used. In this case, a training sequence corresponding to the two data streams is [−1, 1, 1, −1, 0, 0, 0, 0; 0, 0, 0, 0, −1, 1, 1, −1]. Data obtained after space-time multiplexing output data is added is [−1, 1, 1, −1, 0, 0, 0, 0, 0.0150−0.0150i, 0.0410−0.0410i, 0.0911−0.0911i, 0.1475−0.1474i; 0, 0, 0, 0, −1, 1, 1, −1, 0.0240−0.0240i, 0.0641−0.0641i, 0.1197−0.1197i, 0.1719−0.1719i]. The two data streams are transmitted through two transmit antennas (note: a length of a training sequence is usually less than a length of transmitted data, and to simply describe channel encoding based on a training sequence, not too much spatial multiplexing output data is used herein).

Figure 6:
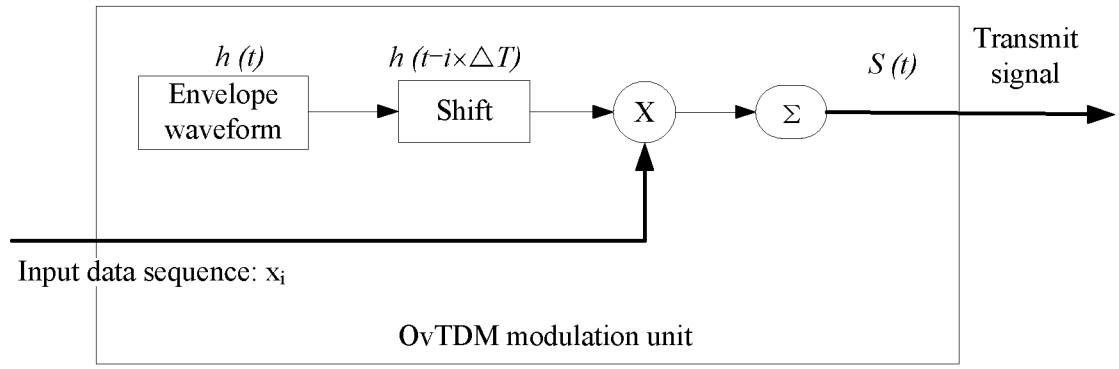
FIG. 6 is an optional signal transmission block diagram of an overlapped time division multiplexing system according to an embodiment of the present disclosure.
Figure 7:
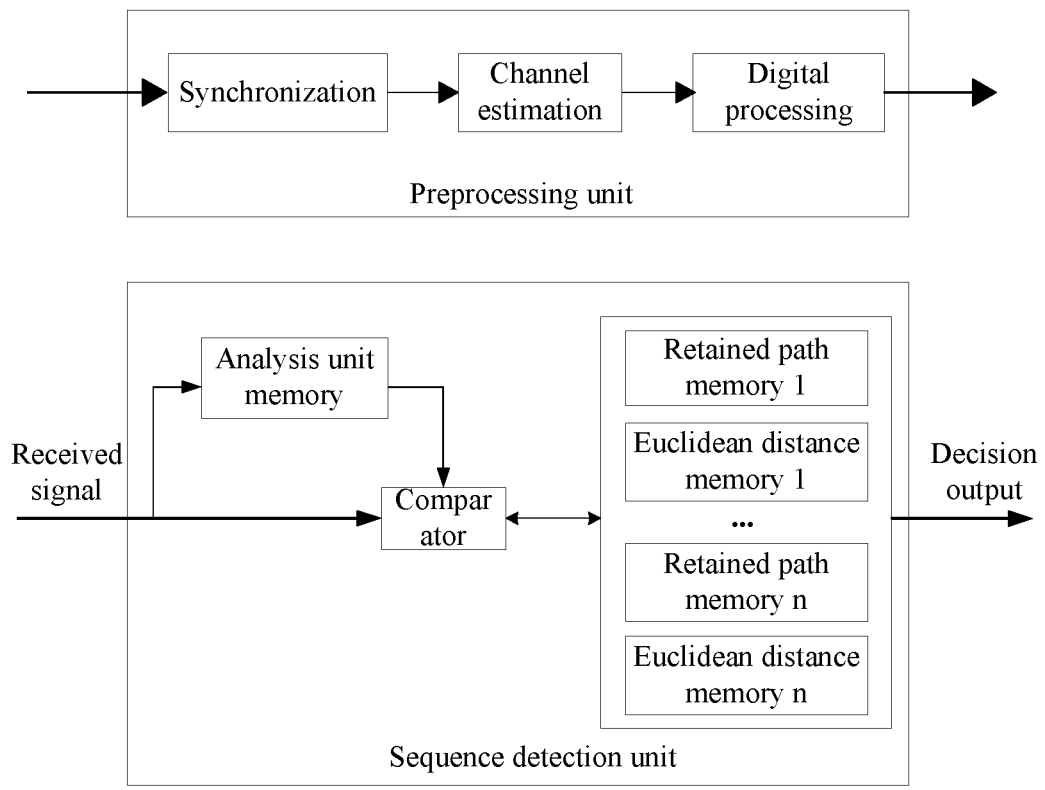
FIG. 7 is an optional signal receiving block diagram of an overlapped time division multiplexing system according to an embodiment of the present disclosure.

Second, Receiving Process:

A transmit end transmits an encoded and modulated signal through an antenna, and the signal is transmitted through a radio channel. FIG. 6 and FIG. 7 show a signal receiving process. In addition, a plurality of receive antennas receive data. The receive end first performs semi-blind channel estimation based on a training sequence, then removes the training sequence and detects other remaining transmitted data by using a corresponding detection algorithm, then decodes and demodulates detection output data, and finally outputs a bit stream through decision. 5. Perform Semi-Blind Channel Estimation Based on a Least Square Algorithm and a Minimum Mean Square Error Algorithm Semi-blind estimation is a channel estimation method that combines advantages of two methods: blind detection (blind detection mainly achieves an objective of channel estimation based on potential structural characteristics of a channel or characteristics of an input signal, and is not described in detail herein) and training-sequence-based estimation. A very few training sequences are used in the semi-blind estimation. In this patent, corresponding estimation is performed and a channel coefficient is initialized by using the minimum mean square error channel estimation algorithm, and then a training sequence is detected by using the least square detection algorithm. Detection output data is used as a virtual training sequence to perform channel estimation again, until a specific effect is achieved. A specific process of semi-blind estimation at the receive end is as follows:

(1) Initialize a quantity of times of estimation: k=0. Perform corresponding minimum mean square error channel estimation by denoting data corresponding to a training sequence (a training sequence including noise) in data received by the receive end as a variable R and denoting a known training sequence (a training sequence not including noise, or first training data) as a variable S, where a relationship between the two is as follows:

$$R=HS+N,$$

where H indicates a channel parameter matrix, and N indicates a corresponding noise matrix.

Then estimate $\hat{H}_K$ by using the minimum mean square error channel estimation algorithm, so that a minimum mean square error between an actual value and an estimated value is minimized, where $\hat{H}_K$ indicates a channel parameter matrix obtained at the $k^{th}$ time. In addition, it is ensured that a mean square error between a received joint vector wR (w indicates a coefficient in the joint vector, a relational expression about the joint vector is $\hat{H}_k=\hat{w}_k R$, and $\hat{w}_k$ indicates a joint vector coefficient obtained through the $k^{th}$ estimation) and an actual channel parameter H is minimized, as shown below:

$$\hat{w}_k = \min_w \{(H-wR)^2\}$$

Therefore, a corresponding estimated value of $\hat{w}_k$ obtained based on the foregoing joint vector formula and the channel parameter matrix is as follows:

$$\hat{w}_k = \frac{E[HS^H H^H]}{E[HS^H SH^H]+E[NN^H]}$$

Finally, a channel parameter estimation matrix is obtained as follows:

$$\hat{H}_k = \frac{R_H}{(R_H + \sigma^2(SS^H)^{-1})} \cdot \frac{R}{S},$$

where $\hat{H}_k$ indicates a channel parameter matrix obtained at the $k^{th}$ time, $R_H=E[HH^H]$ indicates a channel autocorrelation matrix (a statistical characteristic), and $\sigma^2$ indicates noise power.

(2) Perform corresponding detection based on the channel parameter estimation matrix $\hat{H}_k$ and by using the least square detection algorithm, that is, obtain estimated data $\hat{S}_k$ of the $k^{th}$ time, to minimize a noise variance:

$$\hat{S}_k = \min_s \|R - \hat{H}_k S\|^2$$

Obtained corresponding estimated data is as follows:

$$\hat{S}_k = (\hat{H}_k^H \hat{H}_k)^{-1} \hat{H}_k R,$$

where $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$, and $\hat{S}_k$ indicates the estimated data obtained at the $k^{th}$ time.

(3) Assuming that k=k+1, use the estimated data as a virtual training sequence to perform channel estimation, that is:

$$\hat{H}_k = \frac{R_{\hat{H}_{k-1}}}{\left(R_{\hat{H}_{k-1}} + \sigma^2(\hat{S}_{k-1}\hat{S}_{k-1}^H)^{-1}\right)} \cdot \frac{R}{\hat{S}_{k-1}},$$

where $(\hat{S}_{k-1})^H$ indicates a conjugate transpose operation of $(\hat{S}_{k-1})$, $(\hat{S}_{k-1}\hat{S}_{k-1}^H)^{-1}$ indicates an inverse operation of $$(\hat{S}_{k-1}\hat{S}_{k-1}^H), R_{\hat{H}_{k-1}} = E[\hat{H}_{k-1}\hat{H}_{k-1}^H], R_{\hat{H}_{k-1}}$$

indicates a channel autocorrelation matrix corresponding to an estimated channel parameter matrix, $$R_{\hat{H}_{k-1}} = E[HH^H]$$

upon the first estimation, $E(HH^H)$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ time, $\hat{S}_{k-1}$ indicates estimated data obtained at the $(k-1)^{th}$ time, and $\hat{H}_k$ indicates a channel parameter matrix obtained at the $k^{th}$ time.

(4) Repeat step (2) and step (3) to cyclically perform channel estimation and data detection until the following stop principle is satisfied: $(\hat{H}_{k-1},\hat{S}_{k-1})=(\hat{H}_k,\hat{S}_k)$, where $\hat{H}_{k-1}$ indicates the channel parameter matrix obtained at the $(k-1)^{th}$ time, $\hat{S}_{k-1}$ indicates the estimated data obtained at the $(k-1)^{th}$ time, $\hat{H}_k$ indicates the channel parameter matrix obtained at the $k^{th}$ time, and $\hat{S}_k$ indicates the estimated data obtained at the $k^{th}$ time.

The following describes the blind estimation process by using an example: Assuming that received data is a 2×L1 matrix, using the first 12 columns as an example, the received data is as follows: r=[0.2849+0.1618i, −0.1829−0.4103i, −0.2963−0.1999i, 0.0376+0.1996i, 0.2577−0.3266i, −0.3208+0.0813i, 0.0270+0.1280i, −0.3714−0.0813i, −0.1212−0.1790i, 0.0549+0.0599i, 0.0088+0.0143i, −0.1676+0.2476i; 0.0282+0.5712i, 0.2349−0.6366i, 0.2396−0.8315i, −0.1979+0.3508i, 0.1621+0.7298i, 0.1593−0.7183i, 0.5067−0.5767i, 0.1649+0.5036i, 0.1949+0.3310i, −0.0511−0.0522i, −0.3634+0.0459i, −0.2519−0.2717i]. Then estimate a channel parameter matrix for the first time based on a known training sequence and by using the minimum mean square error method: [−0.1026−0.1230i, −0.0266+0.0727i; 0.0791−0.2901i, 0.0399−0.3043i]. Then estimate a training sequence by using the least square detection method, to obtained corresponding estimated data: [−1.8526+0.7156i, 2.7410+0.4950i, 2.1478−0.2490i, −1.2365−0.5972i, 0.2202+1.4328i, 0.8061−0.9891i, −0.3687+0.8351i, 0.3511−1.7629i; 0.0602−0.1158i, −0.4391−0.3552i, 0.6695+0.3786i, −0.0960+0.2531i, −2.3124−0.5877i, 1.4739+1.0638i, 2.5462+0.6313i, −2.1322+2.4104i]. In addition, use the estimated sequence training as a virtual sequence training and perform channel estimation again, to obtain a channel parameter estimation matrix: [−0.3175−0.4649i, −0.0171+0.3434i; 0.2303−0.6645i, 0.0517−0.7578i], and so on. Repeatedly perform channel estimation and detection in such a way, until a finally estimated channel parameter tends to be unchanged.

6. Detection Algorithm

Data corresponding to a position of a training sequence in received data is removed, and remaining transmitted data is correspondingly detected based on an estimated channel parameter matrix. Common detection algorithms include: a traditional detection algorithm such as maximum likelihood (ML) detection, zero forcing (ZF) detection, or minimum mean square error (MMSE) detection; a combination of successive interference cancellation and a traditional detection algorithm; and the like. In addition, the combination of series interference cancellation and a traditional detection algorithm includes: successive interference cancellation-zero forcing (SCI-ZF) detection, successive interference cancellation-minimum mean square error (SCI-MMSE) detection, and the like.

In addition, a plurality of detection output data streams are combined into one stream. For example, assuming that there are two receive antennas, correspondingly, there are two detection output data streams. Then a first data stream is used as output data corresponding to old positions, and a second data stream is used as output data corresponding to even positions.

7. Decoding

Figure 8:
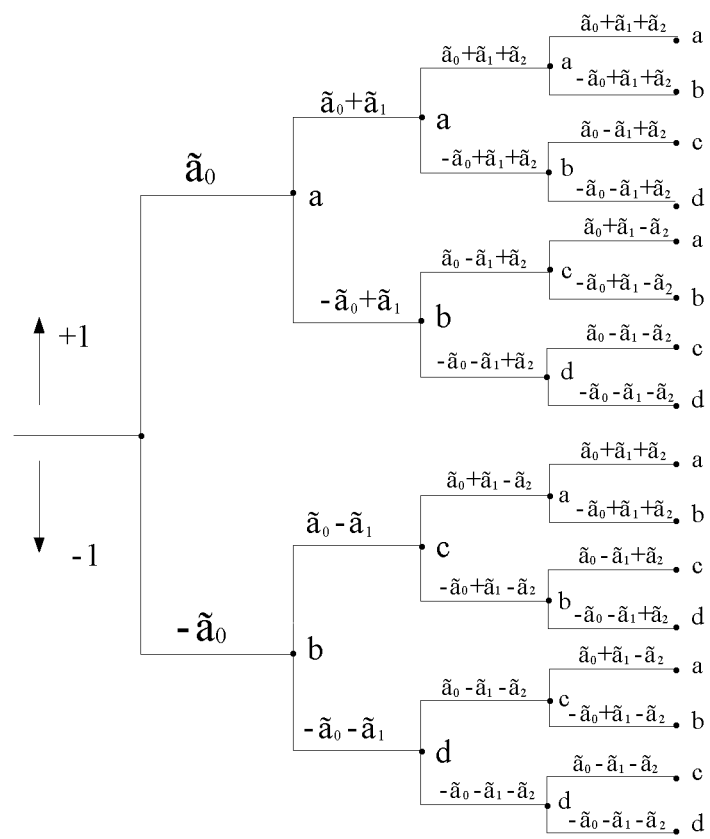
FIG. 8 is an optional input-output relationship diagram of an overlapped time division multiplexing system according to an embodiment of the present disclosure.
Figure 9:
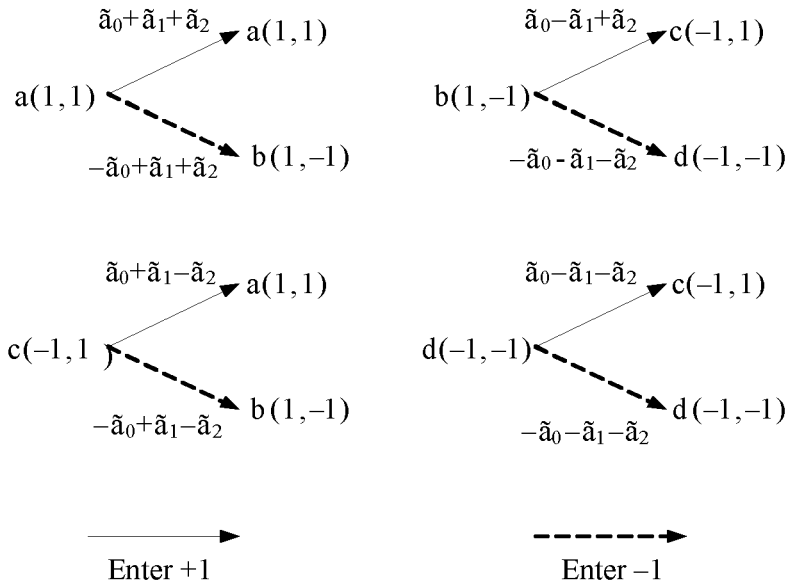
FIG. 9 is an optional node state transition diagram according to an embodiment of the present disclosure.
Figure 10:
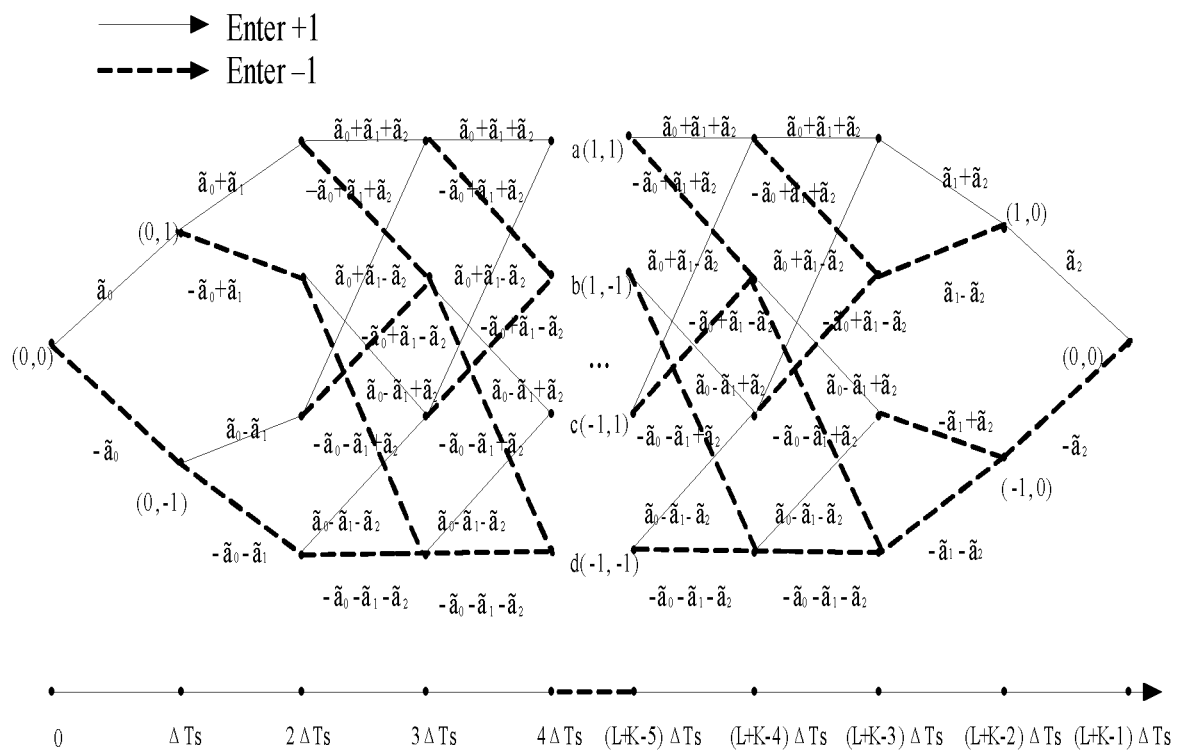
FIG. 10 is an optional trellis diagram of an overlapped time division multiplexing system according to an embodiment of the present disclosure.

Detection output is decoded. Decoding implementation algorithms generally include MAP, Log-MAP, Max-Log-MAP, SOVA, and the like, and there are many implementation methods. FIG. 8 is an input-output relationship diagram of an overlapped multiplexing system when K=3. FIG. 9 is corresponding node state transition relationship diagram. FIG. 10 is a trellis diagram of an overlapped multiplexing system when K=3.

8. Demodulation

Demodulation is a process of restoring information from a modulated signal carrying a message, and is an inverse process of modulation. Using BPSK demodulation as an example, a direct representation is that a receive end outputs a real part of a signal value (an imaginary part is always 0 in a modulation constellation mapping of a BPSK signal).

9. Decision Output

Corresponding decision output is performed on demodulation output, for example, hard decision is performed. When output data is greater than 0, decision output is 1; however, when output data is less than 0, decision output is 0.

According to an embodiment of the present disclosure, a semi-blind channel estimation apparatus is further provided.

Figure 11:
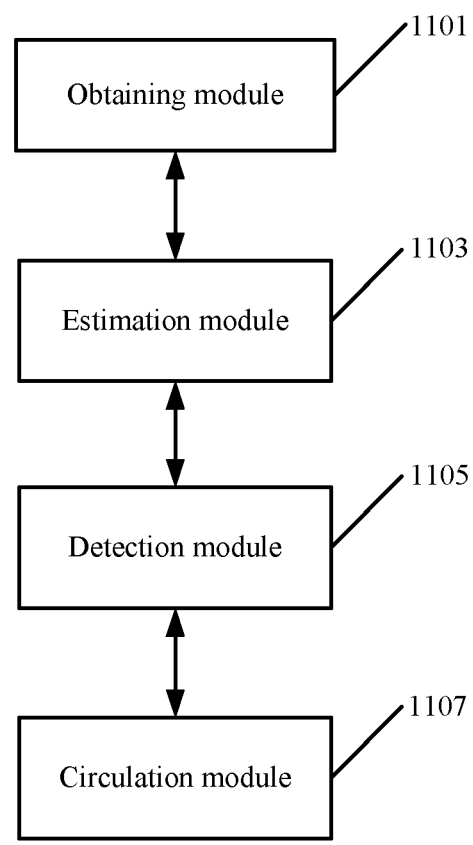
FIG. 11 is a block diagram of an optional semi-blind channel estimation apparatus according to an embodiment of the present disclosure.

As shown in FIG. 11, the semi-blind channel estimation apparatus according to this embodiment of the present disclosure includes: an obtaining module 1101, configured to: obtain data that includes a first training sequence and that is received by the receive end; an estimation module 1103, configured to: perform minimum mean square error channel estimation based on the data and the prestored first training sequence, to obtain a channel parameter matrix; a detection module 1105, configured to: detect the first training sequence by using a least square detection algorithm, to obtain estimated data; and a circulation module 1107, configured to: use the estimated data as a second training sequence, replace the first training sequence in the estimation module 1103 with the second training sequence, and cyclically perform operations on the second training sequence by using the estimation module 1103 and the detection module 1105, until a channel parameter matrix obtained last time is the same as a channel parameter matrix obtained this time, and then stop circulation, to estimate a final channel parameter matrix.

According to an embodiment of the present disclosure, the semi-blind channel estimation apparatus further includes: a determining module (not shown), configured to: determine a first relational expression between the data and the first training sequence, where the first training sequence in the data is a training sequence including noise, and the first relational expression is as follows:

$R = HS + N$, where R indicates the data, H indicates the channel parameter matrix, S indicates the first training sequence, and N indicates a noise matrix.

According to an embodiment of the present disclosure, the estimation module 1103 includes: a first determining module (not shown), configured to: determine a joint vector coefficient based on the first relational expression and a minimum mean square error channel estimation algorithm, and identify a quantity of times of estimating the joint vector coefficient by using a flag bit, where the joint vector coefficient satisfies the following formula:

$$\hat{w}_k = \min_w \{(H - wR)^2\},$$

where $\hat{w}_k$ indicates a joint vector coefficient obtained through the $k^{th}$ estimation; and a second determining module (not shown), configured to: determine the channel parameter matrix based on a second relational expression about a joint vector and the joint vector coefficient, where the second relational expression about the joint vector is $\hat{H}_k = \hat{w}_k R$, and the channel parameter matrix is as follows:

$$\hat{H}_k = \frac{R_{\hat{H}_{k-1}}}{\left(R_{\hat{H}_{k-1}} + \sigma^2 (\hat{S}_{k-1} \hat{S}_{k-1}^H)^{-1}\right)} \cdot \frac{R}{\hat{S}_{k-1}},$$

where $(\hat{S}_{k-1})^H$ indicates a conjugate transpose operation of $(\hat{S}_{k-1})$, $(\hat{S}_{k-1} \hat{S}_{k-1}^H)^{-1}$ indicates an inverse operation of $(\hat{S}_{k-1} \hat{S}_{k-1}^H)$, $$R_{\hat{H}_{k-1}} = E[\hat{H}_{k-1} \hat{H}_{k-1}^H], R_{\hat{H}_{k-1}}$$

indicates a channel autocorrelation matrix corresponding to an estimated channel parameter matrix, $$R_{\hat{H}_{k-1}} = E[HH^H]$$

upon the first estimation, $E(HH^H)$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ time, $\hat{S}_{k-1}$ indicates estimated data obtained at the $(k-1)^{th}$ time, and $\hat{H}_k$ indicates a channel parameter matrix obtained at the $k^{th}$ time.

According to an embodiment of the present disclosure, the detection module 1105 includes: an identification module (not shown), configured to: identify a quantity of times of estimating the estimated data by using a flag bit, where the estimated data is as follows:

$$\hat{S}_k = (\hat{H}_k^H \hat{H}_k)^{-1} \hat{H}_k R,$$

where $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$, and $\hat{S}_k$ indicates estimated data obtained at the $k^{th}$ time.

According to an embodiment of the present disclosure, the semi-blind channel estimation apparatus further includes: a third determining module (not shown), configured to: determine, by using a third relational expression, that a channel parameter matrix obtained last time is the same as a channel parameter matrix obtained this time, where the third relational expression is as follows:

$$(\hat{H}_{k-1}, \hat{S}_{k-1}) = (\hat{H}_k, \hat{S}_k),$$

where $\hat{S}_k$ indicates the estimated data obtained at the $k^{th}$ time.

To sum up, according to the foregoing technical solutions in the present disclosure, in the multiple-antenna overlapped multiplexing system, semi-blind channel estimation is performed based on a least square and a minimum mean square error. In one aspect, a very few training symbols are used, and the minimum mean square error channel estimation algorithm is used to estimate and initialize a channel coefficient, and a recycling algorithm of a blind channel is used, to transmit wanted information as accurately as possible while sacrificing very low bandwidth. In another aspect, estimated data is used as a known training sequence, to leverage an advantage of channel estimation based on a training sequence, and actual known training information is used to restore an originally transferred information sequence, so that a random channel parameter matrix in the multiple-antenna overlapped multiplexing system can be estimated, and performance is superior to performance of least square channel estimation based on a training sequence in the prior art.

The foregoing are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A semi-blind channel estimation method, wherein the semi-blind channel estimation method is applied to a receive end of a multiple-antenna overlapped multiplexing system, and comprises:
   step S1: obtaining data that comprises a first training sequence and that is received by the receive end;
   step S2: performing minimum mean square error channel estimation based on the data and a prestored first training sequence, to obtain a channel parameter matrix;
   step S3: detecting the first training sequence by using a least square detection algorithm, to obtain estimated data; and
   step S4: using the estimated data as a second training sequence, replacing the first training sequence in step S2 with the second training sequence, and cyclically performing step S2 and step S3 on the second training sequence, until a channel parameter matrix obtained last time is the same as a channel parameter matrix obtained this time, and then stopping circulation, to estimate a final channel parameter matrix;
   wherein before the performing minimum mean square error channel estimation based on the data and the prestored first training sequence, to obtain a channel parameter matrix, the method comprises:
   determining a first relational expression between the data and the first training sequence, wherein the first training sequence in the data is a training sequence comprising noise, and the first relational expression is as follows:

$$R = HS + N,$$

wherein R indicates the data, H indicates the channel parameter matrix, S indicates the first training sequence, and N indicates a noise matrix;
   wherein the performing minimum mean square error channel estimation based on the data and the prestored first training sequence, to obtain a channel parameter matrix comprises:
   determining a joint vector coefficient based on the first relational expression and a minimum mean square error channel estimation algorithm, and identifying a quantity of times of estimating the joint vector coefficient by using a flag bit, wherein the joint vector coefficient satisfies the following formula:

$$\hat{w}_k = \min_w \{(H - wR)^2\},$$

wherein $\hat{w}_k$ indicates a joint vector coefficient obtained through the $k^{th}$ estimation; and
   determining the channel parameter matrix based on a second relational expression about a joint vector and the joint vector coefficient, wherein the second relational expression about the joint vector is $\hat{H}_k = \hat{w}_k R$, and the channel parameter matrix is as follows:

$$\hat{H}_k = \frac{R_{\hat{H}_{k-1}}}{\left(R_{\hat{H}_{k-1}} + \sigma^2 \left(\hat{S}_{k-1} \hat{S}_{k-1}^H\right)^{-1}\right)} \cdot \frac{R}{\hat{S}_{k-1}},$$

wherein $(\hat{S}_{k-1})^H$ indicates a conjugate transpose operation of $(\hat{S}_{k-1})$, $(\hat{S}_{k-1} \hat{S}_{k-1}^H)^{-1}$ indicates an inverse operation of $$(\hat{S}_{k-1} \hat{S}_{k-1}^H), R_{\hat{H}_{k-1}} = E[\hat{H}_{k-1} \hat{H}_{k-1}^H], R_{\hat{H}_{k-1}}$$

indicates a channel autocorrelation matrix corresponding to an estimated channel parameter matrix, $$R_{\hat{H}_{k-1}} = E[HH^H]$$

upon a first estimation, $E(HH)^H$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ in time, $\hat{S}_{k-1}$ indicates estimated data obtained at the $(k-1)^{th}$ time, and $\hat{H}_k$ indicates a channel parameter matrix obtained at the $k^{th}$ time.

2. The semi-blind channel estimation method according to claim 1, wherein the detecting the first training sequence by using a least square detection algorithm, to obtain estimated data comprises:

identifying a quantity of times of estimating the estimated data by using a flag bit, wherein the estimated data is as follows:

$$\hat{S}_k = (\hat{H}_k^H \hat{H}_k)^{-1} \hat{H}_k R,$$

wherein $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$ and $\hat{S}_k$ indicates estimated data obtained at the $k^{th}$ time.

3. The semi-blind channel estimation method according to claim 2, wherein the semi-blind channel estimation method further comprises:
determining, by using a third relational expression, that a channel parameter matrix obtained last time is the same as a channel parameter matrix obtained this time, wherein the third relational expression is as follows:

$$(\hat{H}_{k-1}, \hat{S}_{k-1}) = (\hat{H}_k, \hat{S}_k),$$

wherein $\hat{S}_k$ indicates the estimated data obtained at the $k^{th}$ time.

4. A semi-blind channel estimation apparatus, wherein the semi-blind channel estimation apparatus is applied to a receive end of a multiple-antenna overlapped multiplexing system, and comprises a hardware processor coupled to a memory, the hardware processor is configured to execute programming modules stored in the memory, and the programming modules comprising:
an obtaining module, configured to: obtain data that comprises a first training sequence and that is received by the receive end;
an estimation module, configured to: perform minimum mean square error channel estimation based on the data and a prestored first training sequence, to obtain a channel parameter matrix;
a detection module, configured to: detect the first training sequence by using a least square detection algorithm, to obtain estimated data; and
a circulation module, configured to: use the estimated data as a second training sequence, replace the first training sequence in the estimation module with the second training sequence, and cyclically perform operations on the second training sequence by using the estimation module and the detection module, until a channel parameter matrix obtained last time is the same as a channel parameter matrix obtained this time, and then stop circulation, to estimate a final channel parameter matrix;
wherein the programming modules further comprises:
a determining module, configured to determine a first relational expression between the data and the first training sequence, wherein the first training sequence in the data is a training sequence comprising noise, and the first relational expression is as follows:

$$R = HS + N,$$

wherein R indicates the data, H indicates the channel parameter matrix, S indicates the first training sequence, and N indicates a noise matrix;
wherein the estimation module comprises:
a first determining module, configured to: determine a joint vector coefficient based on the first relational expression and a minimum mean square error channel estimation algorithm, and identify a quantity of times of estimating the joint vector coefficient by using a flag bit, wherein the joint vector coefficient satisfies the following formula:

$$\hat{w}_k = \min_w \{(H - wR)^2\},$$

wherein $\hat{w}_k$ indicates a joint vector coefficient obtained through the $k^{th}$ estimation; and
a second determining module, configured to determine the channel parameter matrix based on a second relational expression about a joint vector and the joint vector coefficient, wherein the second relational expression about the joint vector is $\hat{H}_k = \hat{w}_k R$, and the channel parameter matrix is as follows:

$$\hat{H}_k = \frac{R_{\hat{H}_{k-1}}}{\left(R_{\hat{H}_{k-1}} + \sigma^2 (\hat{S}_{k-1} \hat{S}_{k-1}^H)^{-1}\right)} \cdot \frac{R}{\hat{S}_{k-1}},$$

wherein $(\hat{S}_{k-1})^H$ indicates a conjugate transpose operation of $(\hat{S}_{k-1})$, $(\hat{S}_{k-1} \hat{S}_{k-1}^H)^{-1}$ indicates an inverse operation of $$(\hat{S}_{k-1} \hat{S}_{k-1}^H), R_{\hat{H}_{k-1}} = E[\hat{H}_{k-1} \hat{H}_{k-1}^H], R_{\hat{H}_{k-1}}$$

indicates a channel autocorrelation matrix corresponding to an estimated channel parameter matrix, $$R_{\hat{H}_{k-1}} = E[HH^H]$$

upon a first estimation, $E(HH^H)$ indicates an expectation of $(HH^H)$, $\sigma^2$ indicates noise power, $\hat{S}_{k-1}$ indicates training data of the $(k-1)^{th}$ estimation, $\hat{H}_{k-1}$ indicates a channel parameter matrix obtained at the $(k-1)^{th}$ time, $\hat{S}_{k-1}$ indicates estimated data obtained at the $(k-1)^{th}$ time, and $\hat{H}_k$ indicates a channel parameter matrix obtained at the $k^{th}$ time.

5. The semi-blind channel estimation apparatus according to claim 4, wherein the detection module comprises:
an identification module, configured to: identify a quantity of times of estimating the estimated data by using a flag bit, wherein the estimated data is as follows:

$$\hat{S}_k = (\hat{H}_k^H \hat{H}_k)^{-1} \hat{H}_k R,$$

wherein $(\hat{H}_k)^H$ indicates a conjugate transpose operation of $(\hat{H}_k)$, $(\hat{H}_k^H \hat{H}_k)^{-1}$ indicates an inverse operation of $(\hat{H}_k^H \hat{H}_k)$, and $\hat{S}_k$ indicates estimated data obtained at the $k^{th}$ time.

6. The semi-blind channel estimation apparatus according to claim 5, wherein the programming modules further comprise:
a third determining module, configured to: determine, by using a third relational expression, that a channel parameter matrix obtained last time is the same as a channel parameter matrix obtained this time, wherein the third relational expression is as follows:

$$(\hat{H}_{k-1}, \hat{S}_{k-1}) = (\hat{H}_k, \hat{S}_k),$$

wherein $\hat{S}_k$ indicates the estimated data obtained at the $k^{th}$ time.

* * * * *